United States Patent
Vega

(10) Patent No.: US 9,785,414 B2
(45) Date of Patent: Oct. 10, 2017

(54) DYNAMIC DEVELOPER EDUCATION GENERATING PROCESS

(71) Applicant: International Business Machines Corporation, Armonk, NY (US)

(72) Inventor: Nathan G. Vega, Powell, OH (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/951,641

(22) Filed: Nov. 25, 2015

(65) Prior Publication Data
US 2017/0147291 A1    May 25, 2017

(51) Int. Cl.
*G06F 9/44* (2006.01)
*G06F 9/45* (2006.01)

(52) U.S. Cl.
CPC ............... *G06F 8/30* (2013.01); *G06F 8/427* (2013.01)

(58) Field of Classification Search
None
See application file for complete search history.

(56) References Cited

U.S. PATENT DOCUMENTS

| | | | |
|---|---|---|---|
| 6,510,432 B1* | 1/2003 | Doyle | G06F 17/30864 |
| 7,747,604 B2* | 6/2010 | Hawkins | G06F 17/3089 |
| | | | 707/709 |
| 7,987,170 B2* | 7/2011 | Hirst | G06F 8/35 |
| | | | 707/706 |
| 8,375,361 B2* | 2/2013 | Bell | G06F 8/71 |
| | | | 717/102 |
| 8,386,931 B2* | 2/2013 | Guckenheimer | G06F 9/4446 |
| | | | 715/705 |
| 8,590,776 B2 | 11/2013 | Van Megchelen | |
| 8,615,800 B2* | 12/2013 | Baddour | G06F 17/30864 |
| | | | 705/14.6 |

(Continued)

OTHER PUBLICATIONS

Linstead, Erik, et al. "Sourcerer: mining and searching internet-scale software repositories." Data Mining and Knowledge Discovery 18.2 (2009): 300-336. Retrieved on [May 24, 2017] Retrieved from the Internet: URL <http://link.springer.com/article/10.1007%2Fs10618-008-0118-x?LI=true>.*

(Continued)

*Primary Examiner* — Thuy Dao
*Assistant Examiner* — Cheneca Smith
(74) *Attorney, Agent, or Firm* — George R. McGuire; Bond Schoeneck & King, PLLC; John Pivnichny

(57) ABSTRACT

A system and method for providing a curated learning and community roadmap for a code developer based on a code sample that is parsed to identify the characteristics of the code sample. The identified characteristics are used to query a database having learning content and community resources mapped to possible characteristics of a code sample. The resulting learning content and community resources that are retrieved from the database are thus directed specifically to the characteristics of the code sample and used to provide the code developer with a learning roadmap of the learning content as well as a community roadmap of community resources. The possible characteristics comprise file types, import statements, specific code and are mapped to beginner content, intermediate content, and advanced content, respectively.

3 Claims, 3 Drawing Sheets

(56) References Cited

U.S. PATENT DOCUMENTS

| | | | | |
|---|---|---|---|---|
| 8,667,456 | B1* | 3/2014 | Czymontek | G06F 8/315 |
| | | | | 707/696 |
| 9,275,148 | B1* | 3/2016 | Elassaad | G06F 17/30864 |
| 2004/0205580 | A1* | 10/2004 | De Angelis | G06F 17/2264 |
| | | | | 715/236 |
| 2006/0235736 | A1* | 10/2006 | Guckenheimer | G06F 9/4446 |
| | | | | 715/708 |
| 2007/0299825 | A1* | 12/2007 | Rush | G06F 17/30997 |
| 2008/0301639 | A1* | 12/2008 | Bell | G06F 8/71 |
| | | | | 717/120 |
| 2009/0089271 | A1* | 4/2009 | Hirst | G06F 9/4446 |
| 2012/0011113 | A1* | 1/2012 | Cohen | G06F 17/30011 |
| | | | | 707/723 |
| 2012/0311426 | A1* | 12/2012 | Desai | G06F 17/2705 |
| | | | | 715/227 |
| 2013/0283232 | A1 | 10/2013 | Van Megchelen | |
| 2014/0236949 | A1 | 8/2014 | Neill | |

OTHER PUBLICATIONS

Dagenais et al. "Recovering traceability links between an API and its learning resources." Software Engineering (ICSE), 2012 34th International Conference on. IEEE, 2012. Retrieved on [May 24, 2017] Retrieved from the Internet: URL <http://ieeexplore.ieee.org/stamp/stamp.jsp?arnumber=6227207>.*

* cited by examiner

DYNAMIC DEVELOPER EDUCATION GENERATING PROCESS

BACKGROUND

The present invention relates to code development tools and, more specifically, to a system and method for providing a curated learning and community roadmap for a code developer.

A developer's behavior for learning a new product, platform, or coding language is fairly consistent due to the standard manner in which the educational aspects of these items are delivered. Typically, a developer will use a search engine and known sites to discover the content and communities of engagement for a particular technology. For example, a developer who wants to learn how to develop an iOS™ operating system mobile application will start by looking for code examples in communities such as github.com or developer.ibm.com. The developer will then deploy the code on a hosting platform like IBM's Bluemix®. After the code has been deployed, a developer will go through the code files, use search engines, and access the community to learn foundationally how to build the application. Thus, the developer must parse a list of search results without confidence in the results, parse the files and code sample for the types of learning needed to build a similar application, and must explore community sites (e.g. meetup.com, developerWorks.com, StackOverflow.com) to find a likeminded group of individuals. As a result, good education and content is not readily accessible as the developer must rely on manual search to find the desired content. Accordingly, there is a need in the art for an approach that can automatically map learning and communities for a user based on a code sample, thereby saving the user time and expense and providing a curated learning and community roadmap that gives the user more confidence in code development.

SUMMARY

The invention is a system and method for providing a curated learning and community roadmap for a code developer. A code sample having at least one characteristic of a plurality of possible characteristics is submitted by a code developer. The code sample is parsed to identify the characteristics of the code sample. A database having learning content and community resources mapped to possible characteristics is then queried using the identified characteristics in the parsed code sample to retrieve learning content and community resources mapped to the identified characteristics. The code developer is then provided with a learning roadmap of the learning content in the database that is mapped to the identified characteristics as well as a community roadmap of community resources in the database that are mapped to the identified characteristics. The possible characteristics comprise file types, import statements, specific code and are mapped to beginner content, intermediate content, and advanced content, respectively.

The system of the present invention thus involves a database having predetermined mappings that map a plurality of possible characteristics of a code sample to learning content and community resources about the plurality of possible characteristics and a content mapping engine programmed to receive a code sample from a code developer, to parse the code sample to identify at least one characteristic of the plurality of possible characteristics sample, and to query the database using the identified characteristics in the parsed code sample to retrieve learning content mapped to the identified characteristics. A learning output module is programmed to provide the retrieved learning content and community resources to the code developer.

The invention also involves a computer program product for providing a curated learning and community roadmap for a code developer, where the computer program product comprises a computer readable storage medium having program instructions embodied therewith that cause the computing device to receive a code sample from a code developer having at least one characteristic of a plurality of possible characteristics, parse the code sample to identify any characteristics in the code sample, query a database having learning content mapped to the plurality of possible characteristics using the identified characteristics in the parsed code sample to retrieve learning content mapped to the identified characteristics, query a database having community resources mapped to a plurality of possible characteristics based on the identified characteristics in the parsed code sample to retrieve learning content mapped to the identified characteristics, provide the code developer with a learning roadmap of learning content in the database that is mapped to the identified characteristics, and provide the code developer with a community roadmap of community resources in the database that are mapped to the identified characteristics.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
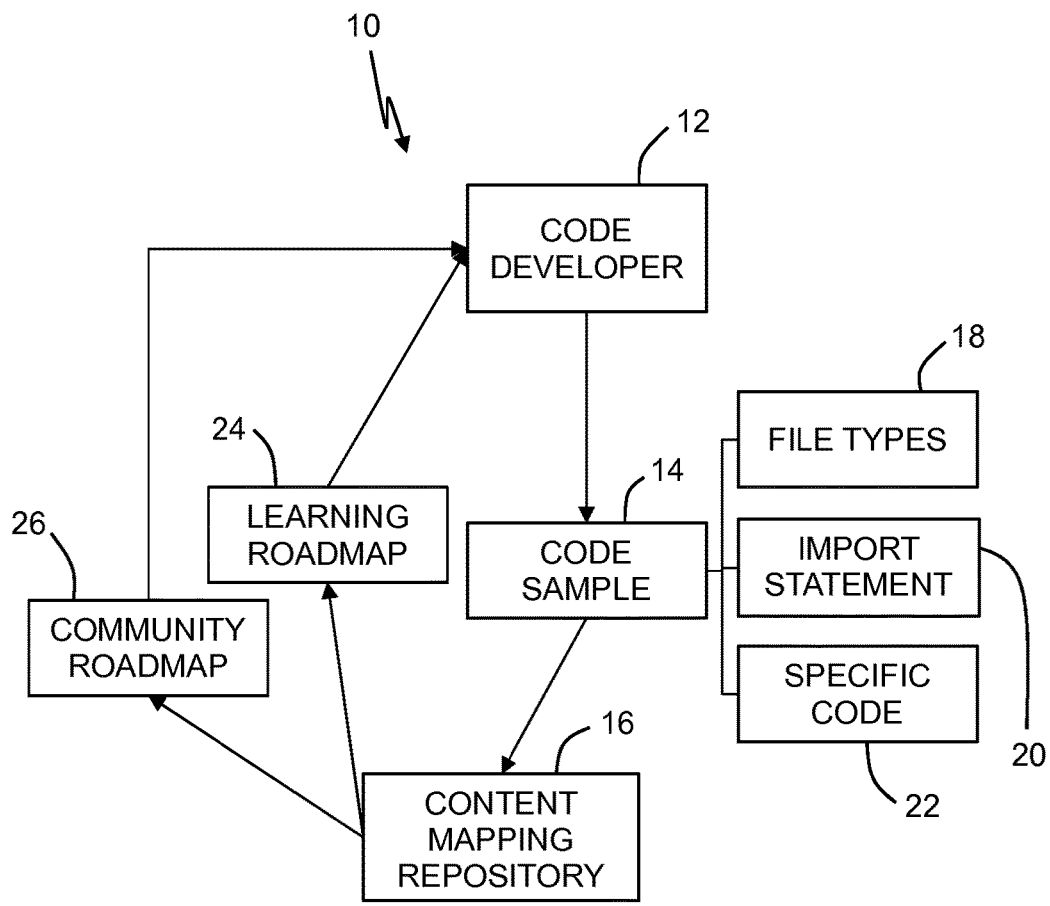
FIG. 1 is a schematic of a system for providing a curated learning and community roadmap for a code developer.

Referring now to the drawings, wherein like reference numerals refer to like parts throughout, there is seen in FIG. 1 a system 10 for providing a curated learning and community roadmap for a code developer 12. Code developer 12 provides a code sample 14 to a content mapping repository 16. Content mapping repository 16 analyzes code sample 14 to identify any identifying characteristics of code sample 14, such as file types 18 that indicate the particular programming language (e.g., .java indicates java learning), import statements 20 that indicate the use of particular libraries (e.g., import java.awt maps to Abstract Windowing Toolkit), and specific code 22 that indicates the use of a specific technology or application program interface (API) (e.g., WatsonAnswer{ } indicates Watson's Question and Answer Service). Once file types 18, import statements 20, and specific code 22 have been identified, content mapping repository 16 can retrieve or direct code developer 12 to the appropriate learning content for the particular file types 18, import statements 20, and specific code 22 found in code sample 14. For example, if specific code 22 includes WatsonAnswer{ }, thereby indicating the use of Watson's Question and Answer Service, code developer 12 can be directed to appropriate Watson meetup groups on meetup.com. Preferably, content mapping repository 16 maps code sample 14 to identify a learning roadmap 24 that includes all mapped community resource content relevant to code sample 14 and a community roadmap 26 that includes all mapped communities relevant to code sample 14. System 10 thus reduces the friction, effort, and time required for a developer to obtain the information needed to build an application. Additionally, system 10 can benefit the hosting platform by keeping users engaged in content and benefit the learning communities and group by encouraging engagement with users.

Figure 2:
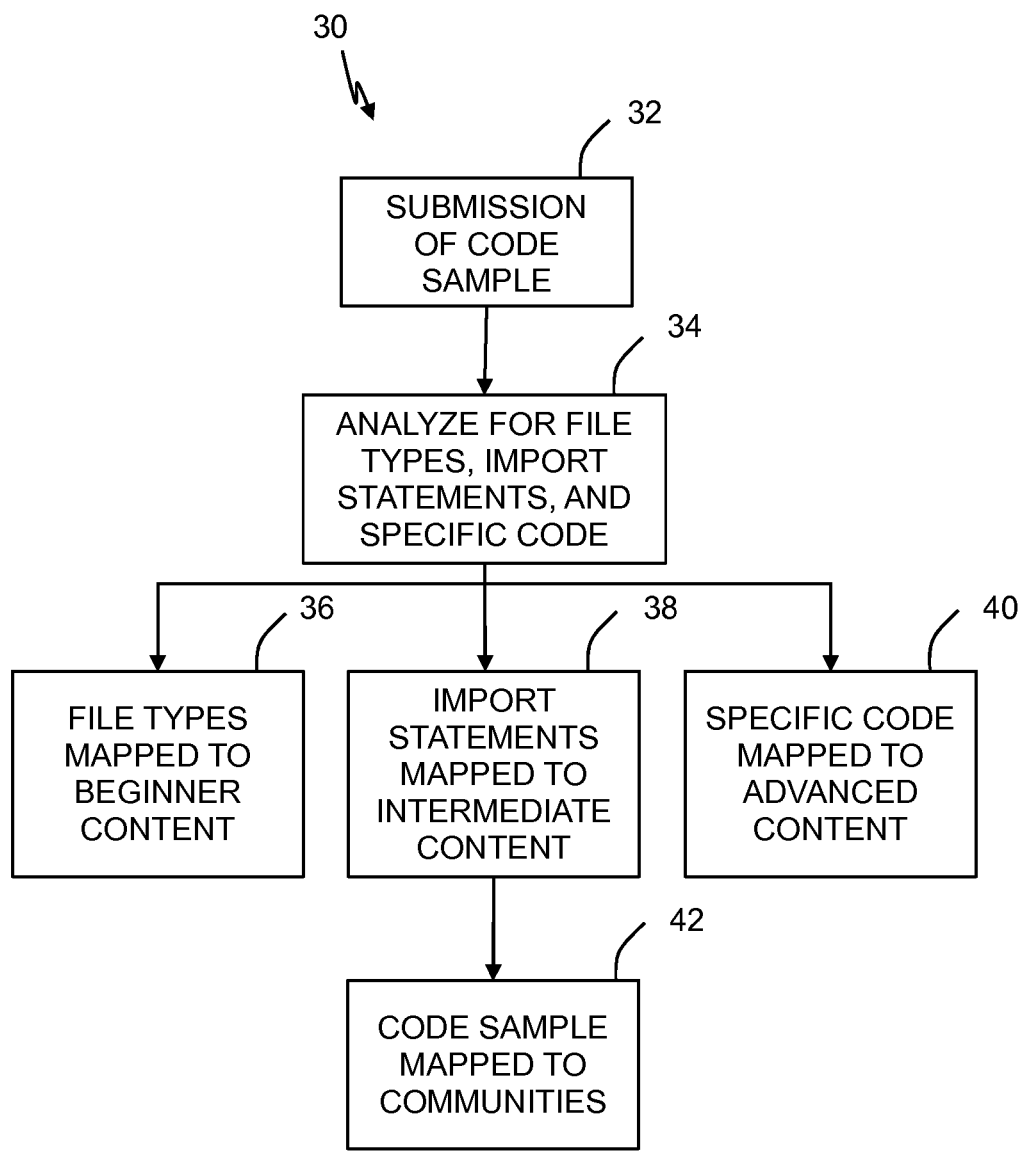
FIG. 2 is a flowchart of a process for providing a curated learning and community roadmap for a code developer.

Referring to FIG. 2, a method 30 according to the present invention begins with a submission 32 where a code developer 12 submits a code sample 14 to a site hosting system 10. Next, code sample 14 is analyzed 34 to identify any file types 18, import statements 20, and specific code 22 found in code sample 14. Any identified file types 18 are mapped to the appropriate beginner content 36, such as tutorials, style sheets, etc. Any identified import statements 20 are mapped to the appropriate intermediate content 38, such as Cloudant® for Mobile, MobileFirst™ for iOS™, and Abstract Windowing Toolkit™. Finally, any identified specific code 22 is mapped to advanced content 40, such as Watson™, IOT Foundation™, and IBM Insights™ for Twitter®. Finally, code sample 14 is used to map to suggested communities and social streams 42 that are appropriate. Thus, the content provided by method 30 and the communities suggested by method 30 are tailored to the specific application and the technology that code developer 12 wants to build.

Figure 3:
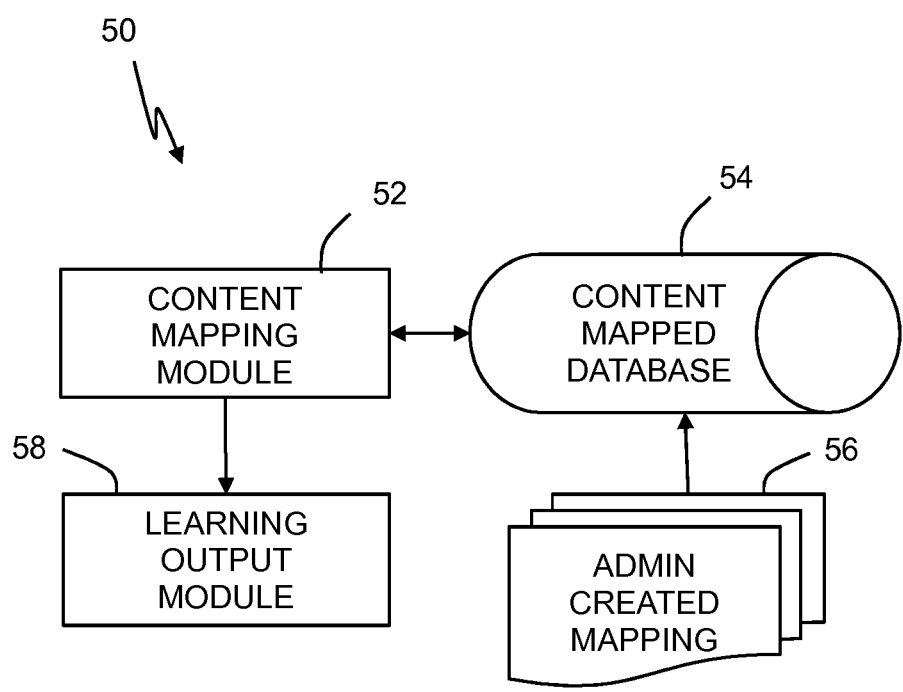
FIG. 3 is a block diagram of a system providing a curated learning and community roadmap for a code developer.

Referring to FIG. 3, an exemplary platform 50 for implementing method 30 comprises a content mapping module 52 having access to a content mapped database 54 that includes relevant content mapped to any potential file types 18, import statements 20, and specific code 22 that may be identified in code sample 14.

Content mapping module 52 is programmed to catalog file extensions in a submitted code sample 14, such as by using a Python™ language script. Database 54 may then be queried by content mapping module 52 to identify any relevant admin created mappings 56 previously stored in database 54 and mapped to the cataloged file extensions. The content retrieved from database 54 may then be provided to code developer 12 by a learning output module 58. Table 1 below illustrates possible predetermined admin created mappings 56 that may be stored in database 54 for file types 18 associated with the cataloged file extensions.

TABLE 1

| File Extension | Language/ Technology | Relevant Learning Content |
| --- | --- | --- |
| .java | JAVA | Introduction to Java programming, Part 1: Java language basics |
| .css | Cascading Stylesheets | http://www.htmldog.com/guides/css/beginner/ |
| .js | Node.js, JavaScript | http://www.baboon.ir/uploads/2015/06/The.Node_.Beginner.Book_.pdf |
| .php | Hypertext Preprocessor | https://merl1yant1.files.wordpress.com/2011/03/php-5-for-dummies.pdf |
| .html | HyperText Markup Language | http://exordio.qfb.umich.mx/archivos%20pdf%20de%20trabajo%20umsnh/LIBROS%2014/HTML5%20Programming%20with%20JavaScript%20For%20Dummies.pdf |

Similarly, content mapping engine 52 is programmed to parse code sample 14 for import statements 20, such as by reviewing for key terms (e.g., #import, Import, <script>). Database 54 may then be queried by content mapping module 52 to identify any relevant admin created mappings 56 previously stored in database 54 and mapped to the parsed import statements. The content retrieved from database 54 may then be provided to code developer 12 by outputting learning module 58. Table 2 below illustrates possible predetermined admin created mappings 56 that may be stored in database 54 for import statements 20.

TABLE 2

| Import Statements | Library (Language) | Relevant Learning Content |
| --- | --- | --- |
| <script src="https://ajax.googleapis.com/ajax/libs/jquery/2.1.3/jquery.min.js"></script> | Jquery (HTML) and ajax | https://learn.jquery.com/ajax/jquery-ajax-methods/ |
| <script src="https://ajax.googleapis.com/ajax/libs/angularjs/1.3.15/angular.min.js"></script> | AngularJS (HTML) | http://www.codecademy.com/learn/learn-angularjs |
| <link rel="stylesheet" href="https://ajax.googleapis.com/ajax/libs/jquerymobile/1.4.5/jquery.mobile.min.css"> | Jquery mobile (HTML) | https://www.ibm.com/developerworks/xml/tutorials/x-jquerymobilejsontut/ |
| import java.awt.*; | Abstract Windowing Toolkit (Java) | http://www.oreilly.com/openbook/javawt/book/ch01.pdf |
| #import <AWSCore/AWSCore.h> | AWS Mobile SDK (C++) | https://docs.aws.amazon.com/mobile/sdkforios/developerguide/setup.html |

Content mapping engine 52 is further programmed to parse code sample 14 for specific code 22 representing specific methods, APIs, or text. Database 54 may then be queried by content mapping module 52 to identify any relevant admin created mappings 56 previously stored in database 54 and mapped to the parsed specific code. The content retrieved from database 54 may then be provided to code developer 12 by outputting learning module 58. Table 3 below illustrates possible predetermined admin created mappings 56 that may be stored in database 54 for specific code 22.

TABLE 3

| Specific Code Statements | Technology | Relevant Learning Content |
|---|---|---|
| .WatsonAnswer {x,y,z} | Watson Question and Answer API | http://www.ibm.com/developer works/cloud/library/cl-watson-films-bluemix-app/ |
| GET https://internetofthings.ibmcloud.com/api/v0001/organizations/${org} | IoT Foundations | https://developer.ibm.com/iotfoundation/recipes/improvise-application-development/ |
| biginsights.user=biblumix biginsights.pwd=biblumix_password_from_service_page | Big Insights for Hadoop | http://db2university.db2oncampus.com/BD001V2EN/Others/Hadoop_Basics_Unit2.pdf |
| cloudant.user=your_cloudant_username cloudant.pwd=your_cloudant_password cloudant.account=your_cloudant_account_name | Cloudant DB | http://www.ibm.com/developer works/cloud/library/cl-guesstheword-app/ |

Finally, content mapping engine 52 is further programmed to query database 54 for relevant community plans based on the identification of file types 18, import statements 20, and specific code 22, which may then be provided to code developer 12 by outputting learning module 58. Table 4 below illustrates possible predetermined admin created mappings 56 that may be stored in database 54 for specific code 22 with respect to community plans.

TABLE 4

| Community Mapping | Technology | How obtained |
|---|---|---|
| J Steven Perry (steve.perry@makotoconsulting.com), Principal Consultant, Makoto Consulting Group, Inc. | Java | The author of JAVA tutorial |
| https://www.ibm.com/developerworks/community/profiles/html/profileView.do?key=15d038f1-daba-40c8-b7c1-2cf4d2ae036f&lang=en | Cloudant | Author of Cloudant technology papers that can be added to your "network" in developerWorks |
| http://www.meetup.com/find/events/?allMeetups=false&keywords=watson&radius=Infinity&userFreeform=Powell%2C+OH&mcId=z43065&mcName=Powell%2C+OH&eventFilter=mysugg | Watson | Using a simple search on meetup.com for Watson |
| https://www.oracle.com/javaone/index.html | Java | Using a search engine to get a list of Java Conferences for 2015 |

It should be recognized by those of skill in the art that mapping could be provided for all current file types 18, import statements 20, and specific code 22. In addition, as new technologies are developed or released and additional content becomes available for old and new technologies, mapping in content mapping module 52 could be updated automatically or manually to include future content. As an alternative or in addition to hard coded mapping, content mapping module 52 can also employ algorithms that tailor the mapping dynamically to the user, such as by customizing the resulting mapped content according to predetermined user preferences, prior user activity, content review, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk™, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing a curated learning and community roadmap for a code developer, comprising the steps of:
receiving a code sample from a code developer having at least one characteristic of a plurality of possible characteristics, wherein the plurality of possible characteristics comprises at least file types, import statements, and specific code;
parsing the code sample to identify one or more of the plurality of possible characteristics in the code sample;
querying, using the identified one or more characteristics in the code sample, a first database comprising beginner, intermediate, and advanced learning content and community resources mapped to the plurality of possible characteristics, wherein the beginner, intermediate, and advanced learning content and community resources comprises a plurality of online learning resources;
mapping any identified file types to beginner learning content and community resources;
mapping any identified import statements to intermediate learning content and community resources;
mapping any identified specific code to advanced learning content and community resources; and
providing the code developer with a learning roadmap of beginner, intermediate, and/or advanced learning content and community resources in the database mapped to the identified characteristics, wherein the learning roadmap of learning content and community resources comprises an identification of one or more of the online learning resources.

2. A system for providing a curated learning and community roadmap for a code developer, comprising:
- a database stored in a memory comprising predetermined mappings that map a plurality of possible characteristics of a code sample to learning content and community resources about the plurality of possible characteristics, wherein the plurality of possible characteristics comprises at least the types, import statements, and specific code; and
- a content mapping engine programmed to: (i) receive a code sample from a code developer; (ii) parse the code sample to identify one or more of the plurality of possible characteristics in the code sample, and (iii) query, using the identified one or more characteristics in the parsed code sample, the database to retrieve learning content and community resources mapped to the identified characteristics, wherein the beginner, intermediate, and advanced learning content and community resources comprises a plurality of online learning resources; (iv) map any identified file types to beginner learning content and community resources; (v) map any identified import statements to intermediate learning content and community resources, (vi) map any identified specific code to advanced learning content and community resources; and
- a learning output module programmed to provide the retrieved learning content and community resources to the code developer.

3. A computer program product for providing a curated learning and community roadmap for a code developer, the computer program product comprising a computer readable storage medium having program instructions embodied therewith, the program instructions executable by a computing device to cause the computing device to:
- receive a code sample from a code developer having at least one characteristic of a plurality of possible characteristics, wherein the plurality of possible characteristics comprises at least file types, import statements, and specific code;
- parse the code sample to identify one or more of the plurality of possible characteristics in the code sample;
- query, using the identified one or more characteristics in the code sample, a database comprising beginner, intermediate, and advanced content and community resources mapped to the plurality of possible characteristics, wherein the beginner, intermediate, and advanced learning content and community resources comprises a plurality of online learning resources;
- map any identified file types to beginner learning content and community resources;
- map any identified import statements to intermediate learning content and community resources;
- map any identified specific code to advanced learning content and community resources; and
- provide the code developer with a learning roadmap of beginner, intermediate, and/or advanced learning content in the database mapped to the identified characteristics and a community roadmap of community resources in the database, wherein the learning roadmap of learning content and community resources comprises an identification of one or more of the online learning resources.

* * * * *